United States Patent
Voigt et al.

(10) Patent No.: US 8,051,722 B2
(45) Date of Patent: Nov. 8, 2011

(54) APPARATUS FOR MEASURING VOLUME- OR MASS-FLOW OF A MEDIUM IN A PIPELINE

(75) Inventors: Frank Voigt, Weil am Rheim (DE); Günther Bähr, Basel (CH)

(73) Assignee: Endress+ Hauser Flowtec AG, Kagenstrasse, Reinach (CH)

( * ) Notice: Subject to any disclaimer, the term of this patent is extended or adjusted under 35 U.S.C. 154(b) by 22 days.

(21) Appl. No.: 12/312,577

(22) PCT Filed: Nov. 15, 2007

(86) PCT No.: PCT/EP2007/062397
§ 371 (c)(1),
(2), (4) Date: Dec. 15, 2009

(87) PCT Pub. No.: WO2008/059020
PCT Pub. Date: May 22, 2008

(65) Prior Publication Data
US 2010/0089171 A1    Apr. 15, 2010

(30) Foreign Application Priority Data
Nov. 17, 2006    (DE) .......................... 10 2006 054 635

(51) Int. Cl.
*G01F 1/58*    (2006.01)
(52) U.S. Cl. .................................................... 73/861.12
(58) Field of Classification Search ................ 73/761.12
See application file for complete search history.

(56) References Cited

U.S. PATENT DOCUMENTS

| | | |
|---|---|---|
| 4,911,594 A | 3/1990 | Fisher |
| 5,773,723 A * | 6/1998 | Lewis et al. ................. 73/861.12 |

FOREIGN PATENT DOCUMENTS

| | | | |
|---|---|---|---|
| DE | 103 12 824 A1 | | 12/2004 |
| EP | 0 179 285 A1 | | 4/1986 |
| EP | 0 892 252 A1 | | 1/1999 |
| EP | 0892252 | * | 1/1999 |
| GB | 1 142 763 | | 2/1969 |
| GB | 2 298 716 A | | 9/1996 |
| GB | 2298716 | * | 9/1996 |

* cited by examiner

*Primary Examiner* — Jewel V Thompson
(74) *Attorney, Agent, or Firm* — Bacon & Thomas, PLLC

(57) ABSTRACT

An apparatus for measuring volume- or mass-flow of a medium in a pipeline. Included is a measuring tube, through which the medium flows in the direction of the longitudinal axis of the measuring tube; a magnet system, which is embodied in such a manner, that it produces a magnetic field passing through the measuring tube essentially transversely to the longitudinal axis of the measuring tube; at least one measuring electrode coupled with the medium, which is arranged in a bore in the wall of the measuring tube in a region lying essentially perpendicular to the magnetic field. The measuring electrode has an elongated electrode shaft having a first widened end region, which is so dimensioned, that its diameter larger is than the diameter of the bore in the wall of the measuring tube, in which the measuring electrode is placed; and a control/evaluation unit, which, on the basis of a measurement voltage induced in the at least one measuring electrode, delivers information concerning volume- or mass-flow of the medium in the measuring tube. In the opposing, second, end region of the electrode shaft of the measuring electrode, at least one radial recess or at least one radial protrusion is arranged. Furthermore, a binding-element is provided, which is so embodied, that it fixes the measuring electrode in the bore of the measuring tube in the axial direction by engaging with the at least one radial recess or protrusion.

8 Claims, 1 Drawing Sheet

APPARATUS FOR MEASURING VOLUME- OR MASS-FLOW OF A MEDIUM IN A PIPELINE

TECHNICAL FIELD

The invention relates to an apparatus for measuring volume- or mass-flow of a medium in a pipeline. The apparatus includes: a measuring tube, through which the medium flows in the direction of the longitudinal axis of the measuring tube; a magnet system, which is embodied in such a manner, that it produces a magnetic field passing through the measuring tube and extending essentially transversely to the axis of the measuring tube; and at least one measuring electrode coupling with the medium and arranged in a bore in the wall of the measuring tube in a region lying essentially perpendicular to the magnetic field. The measuring electrode has an elongated shaft having, coupling with the medium, a first, widened, end region, which is so dimensioned, that its diameter is larger than the bore in the wall of the measuring tube, in which the measuring electrode is placed; and a control/evaluation unit, which, on the basis of a measurement voltage induced in the at least one measuring electrode, delivers information concerning volume- or mass-flow of the medium in the measuring tube.

BACKGROUND DISCUSSION

Magneto-inductive flow measuring devices utilize, for volumetric flow measurement, the principle of electrodynamic induction: Charge carriers of the medium moved perpendicularly to a magnetic field induce a measurement voltage in measuring electrodes likewise arranged essentially perpendicularly to the flow direction of the medium and perpendicularly to the direction of the magnetic field. The measurement voltage induced in the measuring electrodes is proportional to the flow velocity of the medium averaged over the cross section of the measuring tube; it is thus proportional to the volume flow rate. If the density of the medium is known, then the mass flow in the pipeline, or in the measuring tube, can be determined. The measurement voltage is usually sensed via a measuring electrode pair, which is arranged, as regards coordinates, along the measuring tube axis in the region of maximum magnetic field strength and where, thus, the maximum measurement voltage is to be expected. The measuring electrodes are usually galvanically coupled with the medium; however, also magneto-inductive flow measuring devices with capacitively coupling measuring electrodes are known. Subsequently herein, exclusively measuring electrodes coupling galvanically with the medium will be discussed.

The measuring tube can be manufactured either of an electrically conductive material, e.g. stainless steel, or it is composed of an electrically insulating material. If the measuring tube is manufactured of an electrically conductive material, then it must be lined with a liner of an electrically insulating material in the region coming in contact with the medium. The liner is composed usually of a thermoplastic- or a thermosetting-plastic or an elastomeric, synthetic material. However, also magneto-inductive flow measuring devices equipped with a ceramic lining are known.

The measuring electrodes are, besides the magnet system, fundamental components of a magneto-inductive flow sensor. In the construction and arrangement of the measuring electrodes, it is to be assured, that they can be assembled in the measuring tube as simply as possible and that, subsequently in measurement operation, no sealing problems occur; moreover, the measuring electrodes should be distinguished by a sensitive and, simultaneously, low-disturbance registering of the measurement signal.

Fundamentally, two types of electrode constructions can be distinguished:
  Measuring electrodes, which are inserted and assembled from the outside into the measuring tube; and
  measuring electrodes, which are inserted and assembled from the inside into the measuring tube.

In the case of the first type, the structure of the electrode head is limited by the diameter of the bore: Assembly from the outside is only possible, when the diameter of the electrode head is smaller than, or equal to, the diameter of the bore in the wall of the measuring tube, into which the measuring electrode is placed. Preferably, measuring electrodes assembled from outside are rod electrodes, such as are described, for example, in EP 0 892 252 A1. Preferably, rod electrodes are used in the case of magneto-inductive, flow measuring devices of small nominal diameter, thus in cases, where assembly from the inside is difficult or not at all feasible, due to the small dimensions. Furthermore, it is, however, also quite acceptable to use rod electrodes in the case of flow measuring devices of greater nominal diameters, since rod electrodes with a 'Christmas tree' structure in the region of the electrode shaft can be used, such as disclosed in European patent, EP 0 892 252 A1, without great effort, in a measuring tube of synthetic material or in a measuring tube having a liner of plastic, or synthetic material.

In the case of the second type of measuring electrode, the limitation as regards the dimensioning of the electrode head is absent; here, the electrode shaft must only be so embodied, that it can be assembled in the bore. The electrode head can, here, depending on application, vary both in size as well as also in form, within broad limits. Known, internally mountable, measuring electrodes have, usually, e.g. mushroom-, lens- or plate-shaped, electrode heads. Both types of measuring electrodes are used by the assignee in its flow measuring devices.

British Patent, GB 2 298 716 A discloses two different variants of measuring electrode designs. In the case of the first embodiment, the mushroom-shaped measuring electrode is secured in a bore of the measuring tube lined with an electrically insulating material via a spring washer and a screwed connection. In order to avoid, that medium can penetrate into the bore, there is provided, on the inner surface of the mushroom-shaped electrode head, a circumferential edge, which presses into the liner material in the assembled state. In the case of the second variant, the sealing action is achieved through a sharp-edged, frustoconically-shaped thickening in the region of the electrode shaft. Also in the case of this embodiment, the securement of the measuring electrode in the bore occurs via a Belleville spring and a screwed connection.

SUMMARY OF THE INVENTION

An object of the invention is to provide a magneto-inductive flow measuring device with measuring electrodes, which are simple to assemble.

The object is achieved by the features that: in the opposite, second end region of the elongated shaft of the measuring electrode, at least one radial recess or at least one radial protrusion is arranged, and that a binding element is provided, which so is embodied, that it fixes the measuring electrode in the bore of the measuring tube in the axial direction by engaging with the at least one radial recess or protrusion. Through application of the binding element, the assembly of a measuring electrode can be significantly simplified, since the spring element and the screwed connection can be omitted; additionally absent is the assembly step, in which the nut must be tightened with a defined torque. According to the invention, the binding element is pushed onto the electrode shaft and affixed in a defined axial position as a result of interaction with the radial protrusion or recess of the measuring electrode.

In order to achieve an optimized, sealed seating of the measuring electrode in the bore, according to an advantageous, further development of the apparatus of the invention, the measuring electrode is provided in the region of the elongated shaft with at least one, frustoconically shaped section, which is so dimensioned and so shaped, that the measuring electrode is anchored in the bore in the axial direction in the assembled state. Preferably, a plurality of frustoconically shaped sections are provided, which are arranged one after the other in the longitudinal direction of the shaft. These frustoconically shaped sections improve the anchoring of the measuring electrode in the bore of the measuring tube and increase, simultaneously, the quality of sealing of the assembly. Through the arrangement of a plurality of frustoconically shaped sections, one after the other, an improved sealing effect is achieved in the region of the measuring electrode.

An advantageous, further development provides for the case, in which the measuring tube is manufactured of a conductive material, that the inner surface of the measuring tube is lined with a liner of an electrically insulating material. Clearly, then, in this case, it is necessary that the bore in the wall of the measuring tube is, likewise, lined with the electrically insulating material.

If the measuring tube is manufactured of an electrically conductive material, then an electrical insulation is necessary between the measuring electrode and the measuring tube. In an advantageous embodiment of the flow measuring device of the invention, it is, consequently, provided, that, between measuring tube and binding element, an electrically insulating, preferably washer-shaped insert is arranged. In the assembled state of the measuring electrode, the insert is supported against the outer wall of the measuring tube. Furthermore, it is provided, that the insert is embodied as a sealing element. In this way, it is prevented, that medium can migrate into the region of the electrical connection of the measuring electrode. Of course, in the case of a measuring tube of an electrically non-conductive material, the insert need only provide a sealing action. Especially, the sealing element prevents, that medium can access the region of the electrical connection via a gap between measuring tube and liner.

As already above mentioned, the widened end region of the measuring-electrode can be embodied to be mushroom-, or lens- or dish-shaped. Of course, also other shapes of electrode heads are usable in connection with the invention. Especially, the shape of the electrode head can be optimally matched to the intended application.

For the purpose of optimized sealing of the measuring electrode in the bore, there is provided, on the inner surface of the widened electrode head, an annular edge, which, in the assembled state of the measuring electrode, presses into the material of the measuring tube, or into the liner. With the embodiments of the invention, it is, consequently, possible, to achieve a triple sealing action in the region of the measuring electrode.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
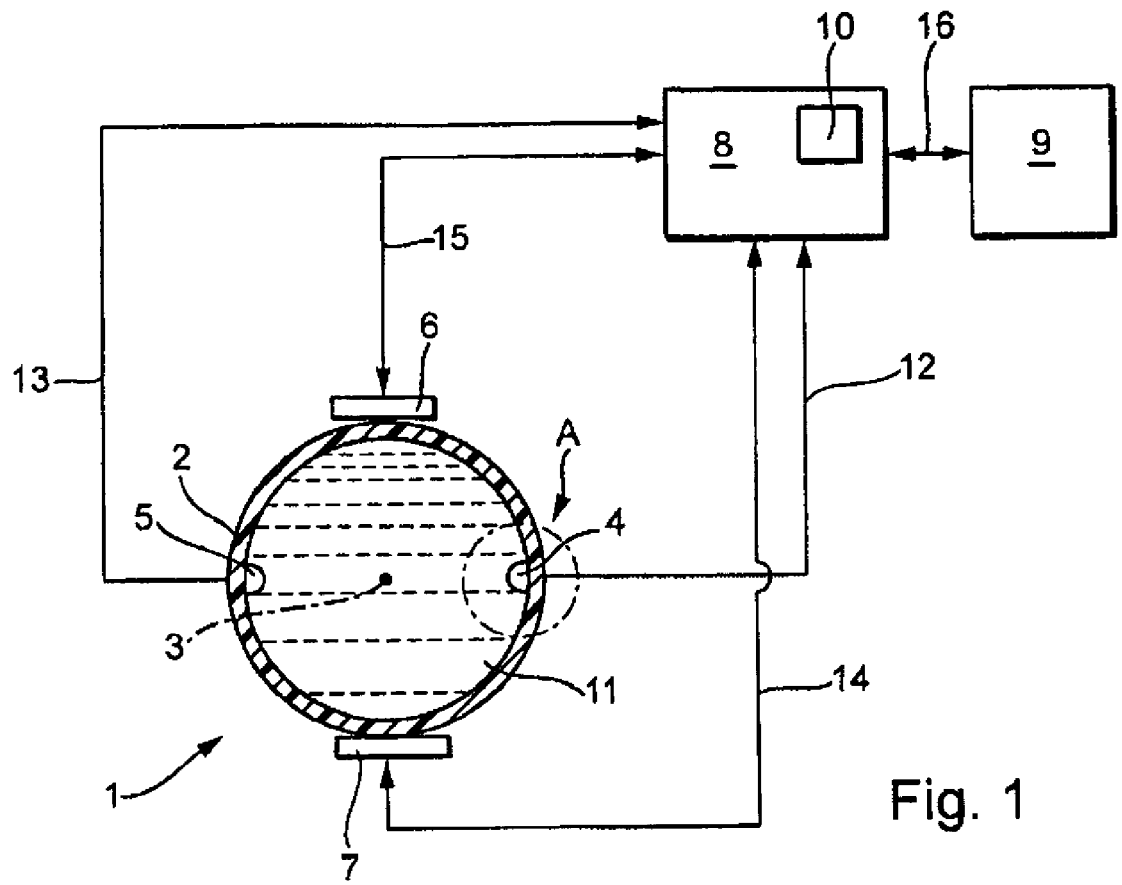
FIG. 1 a schematic drawing of an embodiment of the magneto-inductive, flow measuring device of the invention.

FIG. 1 is a schematic drawing of an embodiment of the apparatus 1 of the invention. The medium 11 flows through the measuring tube 2, in the direction of the longitudinal axis 3 of the measuring tube 2. Medium 11 is electrically conductive, at least to a slight extent. For the case, in which the measuring tube 2 is manufactured of an electrically conductive material, the measuring tube 2 must be lined on its inner surface with an electrically non-conductive liner (see FIG. 2); liner 17 is composed, preferably, of a material, which is resistant, in high measure, chemically and/or mechanically.

The alternating magnetic field B directed perpendicularly to the flow direction of the medium 11 is produced via a magnet system, e.g. via two, diametrally arranged, coil arrangements 6, 7, or via two electromagnets. Under the influence of the magnetic field B, charge carriers located in the medium 11 migrate, depending on polarity, to the two, oppositely poled, measuring electrodes 4, 5. The measurement voltage building on the measuring electrodes 4, 5 is proportional to the flow velocity of the medium 11, averaged over the cross section of the measuring tube 2, i.e. it is a measure for the volume flow rate of the medium 11 in the measuring tube 2. The measuring tube 2 is, moreover, connected with a pipeline, through which the medium 11 flows, via connecting elements (not shown), e.g. flanges.

In the case of the two measuring electrodes 4, 5, such are, preferably, measuring electrodes, whose end regions coming in contact with the medium 11 are widened.

Via electrical connecting lines 12, 13, the measuring electrodes 4, 5 are connected with the control/evaluation unit 8. Connection between the coil arrangements 6, 7 and the control/evaluation unit 8 occurs via the electrical connecting lines 14, 15. Control/evaluation unit 8 is connected via the connecting line 16 with an input/output unit 9. Associated with the control/evaluation unit 8 is a memory unit 10.

Figure 2:
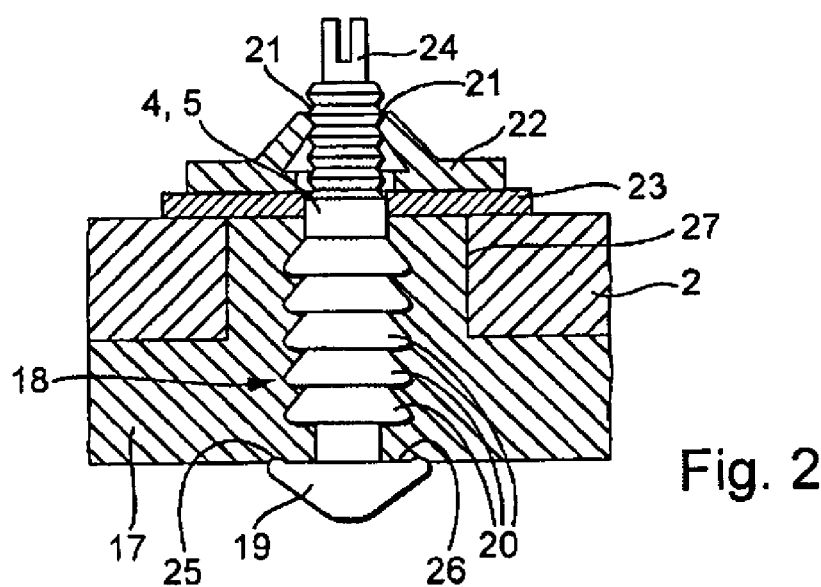
FIG. 2 an enlarged view of the detail of the section of FIG. 1 designated by the letter, A.

FIG. 2 shows an enlarged view of the detail of FIG. 1 bearing the label A. FIG. 2 illustrates a preferred embodiment of the measuring electrode 4; 5 of the invention. Measuring electrode 4; 5 can be assembled from the inside in the bore of the measuring tube 2. Measuring electrode 4; 5 is composed of an elongated electrode shaft 18 and a widened electrode head 19. In the illustrated case, electrode head 19 is mushroom- or lens-shaped. As already above mentioned, electrode head 19 can also be embodied to be dish-shaped. In the longitudinal direction of the electrode shaft 18 are provided, one after the other, a plurality of frustoconically shaped sections 20, so that the electrode shaft 18 has a 'Christmas tree' structure. Since the individual, frustoconically shaped sections 20 are in their edge regions relatively sharply edged, the measuring electrode 4; 5 is anchored in the bore 27 of the liner material 28.

The measuring electrode 4; 5 has a press-fit in the bore 27. This press-fit is achieved by providing, in the end region of the measuring electrode 4; 5 not in contact with the medium 11, a roughening, recess, groove or protrusion 21, into which a resilient, binding element 22 engages. Preferably, feature 21 is a circumferential recess, or protrusion, 21. Arranged between the insulating material 28, or the measuring tube 2, and the binding element 22, is a sealing gasket 23. In the illustrated case, the sealing gasket 23 is composed of an electrically insulating material, whereby an electrical insulation is assured between the measuring electrode 4; 5 and the measuring tube 2.

In summary, the solution of the invention has the following advantages:

Due to the greater room for variation in the construction of the electrode head 19, the measuring performance of the flow measuring device 1 of the invention can be optimized for different applications.

Through the frustoconically shaped sections 20 arranged in 'Christmas tree' structure, however, also, in given instances, through the annular edge 25 on the inner surface 26 of the widened region, and, in given instances, through the sealing gasket 23 between binding element 22 and measuring tube 2, an improved state of sealing is achieved; the probability, that medium 11 can migrate through the bore 27 or along the interface between the liner 17 and the measuring tube 2, into the region of the electrical connection 24 of the measuring electrode 4; 5, is clearly reduced.

The manufacturing process for the flow measuring-device 1 of the invention, and, here, especially, the assembly of the measuring electrodes 4, 5 with the measuring tube 2, is significantly simplified and therewith also very cost-effective.

The invention claimed is:

1. An apparatus for measuring volume- or mass-flow of a medium in a pipeline, comprising:
a measuring tube, through which the medium flows in the direction of the longitudinal axis of said measuring tube;
a magnet system, which is embodied in such a manner, that it produces a magnetic field passing through said measuring tube and extending essentially transversely to the longitudinal axis of said measuring tube;
at least one measuring electrode coupling with the medium and arranged in a bore in the wall of said measuring tube in a region lying essentially perpendicular to the magnetic field. Said measuring electrode has an elongated electrode shaft having, coupling with the medium, a first, widened, end region, which is so dimensioned, that its diameter is larger than the diameter of said bore in the wall of said measuring tube, in which said at least one measuring electrode is placed; and
a control/evaluation unit, which, on the basis of a measurement voltage induced in said at least one measuring electrode, delivers information concerning volume- or mass-flow of the medium in said measuring tube, wherein:
in an opposing, second, end region of said electrode shaft of said measuring electrode, at least one radial recess or at least one radial protrusion is arranged; and
a binding element is provided, which is so embodied, that it fixes said measuring electrode in said bore of said measuring tube in the axial direction by engaging with said at least one radial recess or protrusion.

2. The apparatus as claimed in claim 1, wherein:
in the region of said electrode shaft of said measuring electrode, at least one frustoconically shaped section is provided, which so dimensioned and so shaped, that said measuring electrode is axially anchored in said bore in the assembled state.

3. The apparatus as claimed in claim 1, wherein:
a plurality of frustoconically shaped sections are provided, which are arranged one after the other in the longitudinal direction of said electrode shaft.

4. The apparatus as claimed in claim 1, wherein:
for a case, in which said measuring tube comprises a conductive material, the inner surface of said measuring tube is lined with a liner of an electrically insulating material.

5. The apparatus as claimed in claim 4, wherein:
said bore in the wall of said measuring tube is lined with said electrically insulating material.

6. The apparatus as claimed in claim 1, wherein:
between said measuring tube and binding element, in given instances, an electrically insulating insert is provided, which is supported, in the assembled state of said measuring electrode, against the outer wall said measuring tube.

7. The apparatus as claimed in claim 1, wherein:
the widened end region of said measuring electrode is one of:
mushroom-, or lens- or dish-shaped.

8. The apparatus as claimed in claim 7, wherein:
on an inner surface of said electrode head, an annular edge is provided, which, in the assembled state of said measuring electrode, presses into material of said measuring tube, or into a liner.

* * * * *